United States Patent [19]

Clifford

[11] Patent Number: 4,765,361

[45] Date of Patent: Aug. 23, 1988

[54] PORTED GATE VALVE

[76] Inventor: Walter A. Clifford, 906 Golf View, Tampa, Fla. 33629

[21] Appl. No.: 67,288

[22] Filed: Jun. 29, 1987

[51] Int. Cl.⁴ .................. F16K 3/02; F16K 31/122; F16K 43/00

[52] U.S. Cl. ...................... 137/315; 137/375; 138/94.3; 251/58; 251/174; 251/193; 251/327; 251/328

[58] Field of Search ............ 137/315, 375; 138/94.3; 251/327, 328, 329, 174, 58, 193, 195

[56] References Cited

U.S. PATENT DOCUMENTS

| | | | |
|---|---|---|---|
| 2,883,148 | 4/1959 | Williams | 251/328 |
| 2,950,897 | 8/1960 | Bryant | 251/328 |
| 3,000,608 | 9/1961 | Williams | 251/328 |
| 3,333,816 | 8/1967 | Williams et al. | 251/328 |
| 3,710,816 | 1/1973 | Prince | 251/328 |
| 4,051,863 | 10/1977 | Still | 251/328 |
| 4,257,447 | 3/1981 | Clarkson | 251/328 |

FOREIGN PATENT DOCUMENTS

| | | | |
|---|---|---|---|
| 1086706 | 9/1980 | Canada | 251/328 |
| 2040404 | 8/1980 | United Kingdom | 251/327 |

Primary Examiner—George L. Walton
Attorney, Agent, or Firm—Dominik, Stein, Saccocio & Reese

[57] ABSTRACT

A gate valve formed with spaced parallel housing plates having axially aligned apertures which constitute a housing therebetween. Elastomeric sleeves line the apertures of the housing plates to provide an annular space between the sleeves. An elongated gate plate, having an apertured section and an imperforate section, is positioned in sliding contact with the sleeves. Actuator means reciprocate the gate plate between an open and closed position.

3 Claims, 2 Drawing Sheets

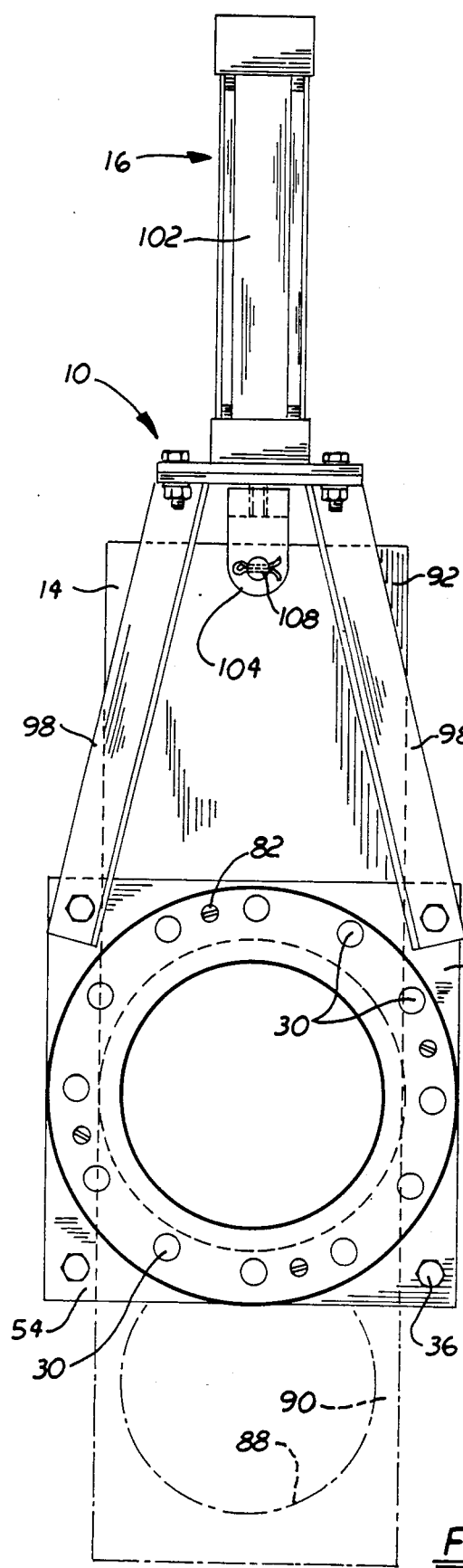
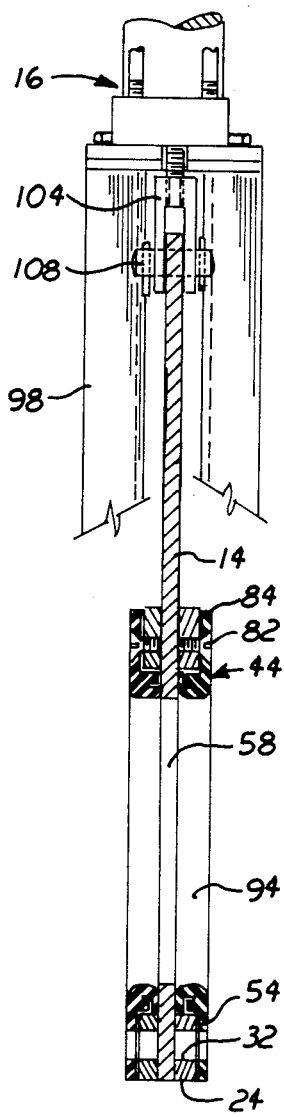
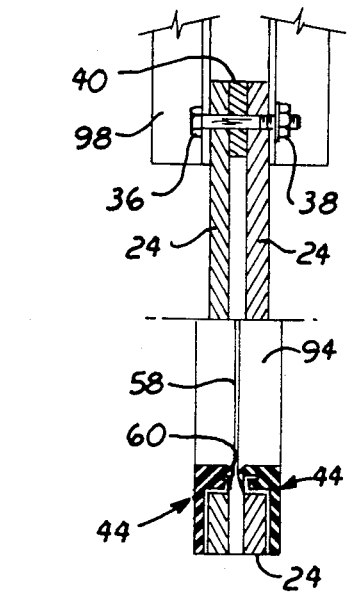
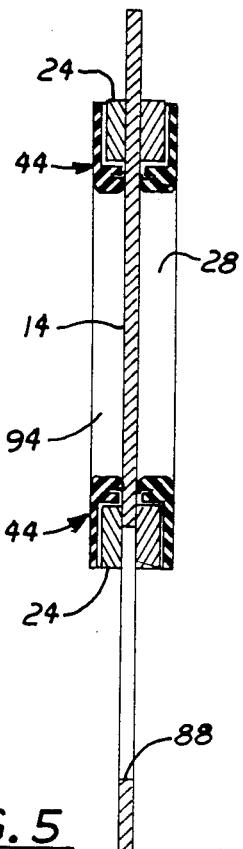
FIG. 3
FIG. 4
FIG. 5
FIG. 6

PORTED GATE VALVE

BACKGROUND OF THE INVENTION

1. Field of the Invention

This invention relates to a gate valve, and, more particularly, to gate valves formed with spaced parallel housing plates with axially aligned apertures for constituting a housing, with sleeves removably coupled to the housing plates defining an annular space therebetween, and with an elongated gate plate having an apertured section and an imperforate section positioned in sliding contact with the sleeves and reciprocable to open and close the valve.

2. Description of the Background Art

In the field of fluid handling, it is common practice to insert a valve along lengths of pipes so that the flow of fluids through the pipes may be selectively interrupted or continued at the control of an operator. One common type of valve is that formed with an apertured housing and an imperforate, reciprocable plate or gate having a knife edge. Such valves are commonly called knife valves. The gate with the knife edge is slidably reciprocable into and out of the housing. The housing is coupled to adjacent ends of coupled pipes. When the gate is retracted out of the housing, the valve is open to allow the flow of fluid through the pipes and housing. When the gate is advanced into the housing, the apertures of the housing are blocked by the gate and the flow of fluid through the pipes and housing is precluded. The housing halves on opposite sides of the gate are secured on their axially exterior faces to the pipes while their interior faces are provided with elastomeric sleeves in tight compressive contact when the gate is retracted to ensure the flow of fluid therethrough without leakage. The advancement of the knife edge of the gate to terminate the flow of fluids causes even further compression of the sleeve. Movement of the gate is effected through an actuator thereabove.

In view of the large number of fixed and movable parts to use, operate, maintain and repair, a typical knife valve is expensive and requires constant attention by a skilled operator. Additionally, the movement of the knife edge of the gate may cause damage to the contacted seal members of the housing upon movement of the gate to the closed position. Further, the relationship of the housing, gate and actuator are generally such that the gate may only be replaced from the actuator side of the housing and only after disassembling the actuator from the housing. Such an arrangement is often disruptive to the use of the pipes and inconvenient to its operator. In addition, sealing sleeves in constant high and varying compression as found in knife valves have decreased lives. Lastly, gate and housing members of knife valves are expensive, requiring casting or machining as compared to the use of less expensive sheet metal cut to size.

A typical knife valve is disclosed in U.S. Pat. No. 4,257,447 to Clarkson. Such knife valve suffers from all of the shortcomings as enumerated above. Further, as is typical in many knife valves, the gate slides against metal sealing rings which cause excessive wear of the gate as well as of the sealing rings thereby necessitating expensive repairs and resulting in costly down time. Such metal to metal contact also accelerates corrosion. In addition, the sealing sleeves of Clarkson are of a multi-piece construction which increases cost, complexity of repair, and enlargement of the stock of repair parts.

Modified knife valves of the Clarkson type have also been used with an elongated gate having both imperforate and apertured sections. While such modified knife valves have extended utility over those of the type described in the Clarkson patent, most of the above-enumerated shortcomings continued, particularly the sleeve being under heavy compression at all times, as well as the wearing on metal to metal surfaces.

An optimum assembly would be something new which combines the benefits of the prior practices without their shortcomings, i.e., an assembly which provides for the efficient gating of pipes; convenient and simplified operation, repair, replacement, etc.; reliable operation over an extended life of valves and their component elements; and economical cost to manufacture, maintain, repair, use and operate.

As illustrated by a great number of prior patents as well as commercial devices, efforts are continuously being made in an attempt to improve valves whereby pipes may convey fluids more efficiently, conveniently, reliably and economically. None of these previous efforts, however, provides the benefits attendant with the present invention. Additionally, prior valves do not suggest the present inventive combination of component elements arranged and configured as disclosed and claimed herein. The present invention achieves its intended purposes, objectives and advantages over the prior art devices through a new, useful and unobvious combination of component elements, with the use of a minimum number of functioning parts, at a reduced cost to manufacture, and by employing only readily available materials.

Therefore, it is an object of this invention to provide improved gate valves formed of spaced parallel housing plates with axially aligned apertures for constituting a housing, with sleeves removably coupled thereto defining an annular space therebetween and with an elongated gate plate having an apertured section and an imperforate section positionable in sliding contact with the sleeves and reciprocable to open and close the valve.

It is another object of this invention to relieve the constant and varying compressive forces on sealing sleeves of a knife valve by supporting such sealing sleeves at a predetermined distance from each other so that a gate plate with no knife edge, and of a thicknesses only slightly greater than the predetermined distance may be used.

It is a further object of this invention to eliminate metal to metal sliding contacts between gate plates and their supporting housings.

It is yet a further object of the present invention to remove and replace gate plates of gate valves without disturbing any other component of the gate valve assembly or associated pipes.

Lastly, it is an object of the present invention to provide an improved gate valve which is more efficient, convenient, reliable, economical and easy to operate and repair.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiments in addition to the scope of the invention defined by the claims taken in conjunction with the accompanying drawings.

SUMMARY OF THE INVENTION

The invention is defined by the appended claims with the specific embodiments shown in the attached drawings. For the purpose of summarizing the invention, the invention may be incorporated into an improved gate valve comprising housing plates secured together in face to face relationship with an aperture extending through each housing plate in axial alignment and defining a chamber therebetween, annular sleeves having sealing projections positioned in operative association with the apertures and extending into the chamber a predetermined distance to define a space therebetween, and a gate plate within the chamber formed with an imperforate section and an apertured section in sliding contact with the sealing projections and reciprocable between an open position wherein the apertured section is located between the apertures and a closed position wherein the imperforate section is located between the apertures.

The gate plate has edges, all of which are not formed as knives. All of the edges of the gate plate are perpendicular to its faces. The gate valve further includes actuator means to reciprocate the gate plate between the open position and the closed position. The gate plate may be inserted into, and removed from, the chamber from either the side of the chamber remote from the actuator means or the side of the chamber adjacent to the actuator means. The gate valve further includes an actuator mounted on the housing plates and located thereabove to reciprocate the gate plate between the open position wherein the apertured section is raised and aligned with the apertures while the imperforate section is above the housing plates and the closed position wherein the imperforate section is lowered and aligned with the apertures while the apertured section is below the housing plates. The gate valve further includes means to releasably couple the actuator and the gate plate whereby the entire gate plate may be slide downwardly from between the housing plates and out of the remainder of the gate valve, or upwardly to between the housing plates and into the remainder of the gate valve, without disassembling any other component of the gate valve or any associated component. The gate valve further includes a horizontal plate with downwardly extending supports coupled to the upper extents of the housing plates. The gate valve further includes actuator means mounted upon the horizontal plate and coupled with the gate plate for moving the gate plate between the open and closed positions. The sealing projections extend axially and line the apertures and the sleeves also have washer-like sections on the radially exterior faces of the housing plates. The washer-like sections have an array of holes extending therethrough in a circular pattern and the housing plates have threaded holes in alignment with the array of holes. The gate valve further includes cap screws to couple the sleeves and the housing plates. The cap screws are of sufficient length to allow the apertured flanges of pipes to be coupled thereby to the sleeves and housing plates with the washer-like sections therebetween. The sleeves are fabricated of an elastomeric material and also include metallic reinforcing rings formed into the elastomeric material. The rings are secured to both the washer-like sections and the sealing projections. The gate valve may further include a plurality of short cap screws to couple the sleeves to the housing plates prior to the coupling of flanges of pipes thereto. All of the cap screws may be of an equal length for coupling the sleeves to the housing plates concurrently with the coupling of flanges of pipes thereto.

In addition, for the purpose of summarizing the invention, the invention may be incorporated into a gate valve assembly. The gate valve assembly comprises a housing which includes two parallel housing plates with each housing plate having an aperture extending therethrough and spacer means securing said housing plates together in face to face relation with their apertures in axial alignment and defining a chamber therebetween. The housing also includes two elastomeric annular sleeves with each having an axially interior sealing projection lining an aperture and extending into the chamber a predetermined distance to define an annular space between the sealing projections. Each sleeve also has an axially exterior washer-shaped gasket positioned on an axially exterior face of a housing plate and extending radially outwardly from its associated aperture. The gate valve assembly also includes a gate plate formed with a first imperforate section and a second section having an aperture and reciprocable within the chamber in sliding contact with the axial interior ends of the sealing projections between an open position wherein the aperture of the gate plate is located in axially alignment with the apertures of the housing plates to allow fluid flow through the chamber and a closed position wherein the imperforate portion of the gate plate is located between the apertures of the housing plates to preclude fluid flow through the chamber. In addition, the gate valve also includes an operator controlled actuator including an actuator cylinder and a selectively reciprocable rod to selectively reciprocate the gate plate between the open and closed positions. The actuator also includes support means to position the actuator cylinder and rod in operative proximity to the gate plate and housing with the rod coupled to the gate plate. The facing ends of the sealing projections are flat with rounded edges extending therefrom with the distance between the facing ends being between about 20 and 40 percent of the thickness of the gate plate.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the follow

FIG. 3 is an elevational view of the gate valve shown in FIG. 1;

FIGS. 4, 5 and 6 are partial, sectional views taken along line 3—3 of FIG. 1 but showing the gate valve in an assembled orientation with the gate plate retracted, advanced, and removed, respectively.

Similar reference characters refer to similar parts throughout the several drawings.

DETAILED DESCRIPTION OF THE INVENTION

Figure 1:
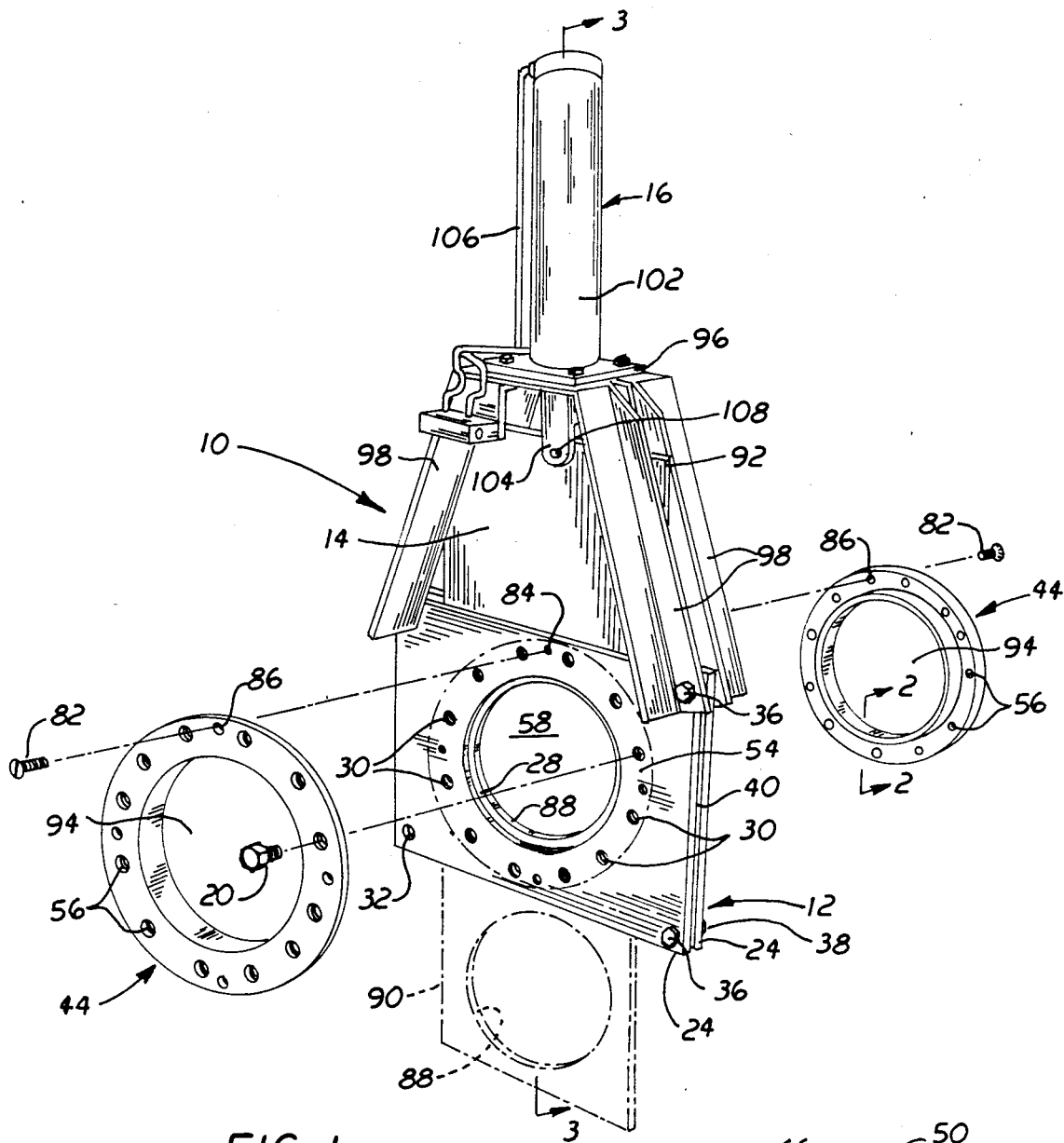
- FIG. 1 is an exploded perspective illustration of a gate valve constructed in accordance with the first or primary embodiment of the invention.
Figure 2:
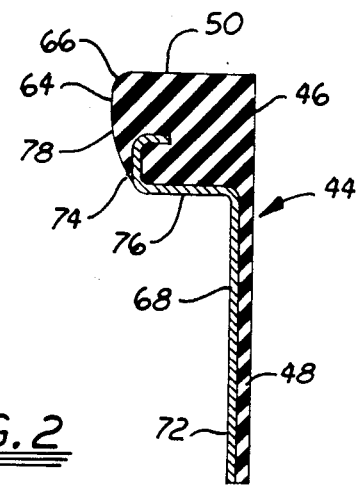
FIG. 2 is a sectional view through one of the sleeves taken along line 2—2 of FIG. 1.

As can be most clearly seen in FIG. 1, the present invention is shown as a gate valve assembly 10 which includes a fixedly positioned housing 12, a gate plate 14 slidable within the housing, and an actuator 16 secured to the housing and operatively coupled to the gate plate. Together, these major components constitute the gate valve 10 which is positionable between adjacent flanged pipes, not shown, or the like for allowing the flow of fluids through the pipes or for precluding the flow of fluids therethrough.

The ends of the pipes to be coupled to the housing are adapted to be secured thereto as by cap screws 20 or the like in the disclosed embodiments. The pipes at their adjacent portions are formed with flanges with spaced holes symmetrically arranged in a conventional circular orientation for receiving the cap screws whereby the pipes may be coupled and uncoupled to the gate valve as may be desired. Since the pipes are generally stationary during operation and use, they couple with the housing which is also stationary during operation and use.

The housing is formed of spaced, parallel housing plates 24 cut to size and of similar configuration. Each plate is generally rectangular and is provided with a central aperture 28 for the flow of fluids therethrough. Also formed in each plate are radially exterior threaded holes 30 in a conventional circular pattern corresponding in location to the apertures of the flanges of the pipes to be coupled thereto. Unthreaded holes 32 are provided in the four corners of the housing plates for the passage of long corner bolts 36 therethrough with nuts 38 for securement purposes. Spacers 40, such as conventional apertured platelets, are provided between the housing plates through which the corner bolts 36 pass to maintain the housing plates 24 in spaced parallel relationship with respect to each other at a predetermined distance. The spacers 40, bolts 36 and nuts 38 constitute the spacer means for securing the housing plates 24 in the appropriate spaced relationship.

Also part of the housing are a pair of similarly shaped annular sealing sleeves 44. The sleeves are formed with a first part 46 fabricated of an elastomeric material. Each first part includes in a washer-like portion 48 on its axially exterior extents. Each first part also includes an axially extending interior seal portion 50 having an exterior diameter of a size to be received in, and effectively line, the aperture 28 of a housing plate.

The flat exterior washer-like portion 48 of the first part 46 of each sleeve 44 is adapted to be positioned over the exterior face 54 of its associated housing plate adjacent to its aperture. The washer-like portion 48 extends radially outwardly from the housing plate aperture 28 and is provided with holes 56 located to correspond to the threaded holes 30 of the housing plates and the flanges of the pipes to be coupled thereto. These washer-like portions function as gaskets between the housing plates and their associated pipes.

The second portion of each sleeve 44 is the radially interior sealing projection 50 which is formed integrally with the washer-like portion. Associated sealing projections 50 extend inwardly into the chamber 58 and are of a length greater than the thickness of the housing plates. Associated sealing projections are correlated with the thickness of the spacers and housing plates so that when the housing plates are coupled the sealing projections will form an annular space 60 with the adjacent ends of the sealing projections separated a distance slightly less than the thickness of the gate plate 14. The facing free ends 64 of the sealing projections are essentially flat with rounded edges 66 extending therefrom. The distance between the facing free ends is between about 20 and 40 percent of the thickness of the gate plate when measured prior to the gate plate being positioned between the sealing projections. For example, when 12 inch diameter pipes are coupled with a 12 inch diameter gate valve, a gate plate with a thickness of 0.375 inches would be utilized. An interference of 0.125 inches between the sealing projections and the gate plate would provide a desired sealing relationship. Larger or smaller diameter pipes and gate valves could, of course be utilized, with larger or smaller gate plates along with appropriate interferences between the sealing projections and the gate plates.

The relationship between the thickness of the gate plate and the distance between the free edges of the sealing projection portions may be seen by comparing FIGS. 4 and 5, sectional views with the gate plate inserted, with FIG. 6, a sectional view with the gate plate removed.

Each sealing sleeve 44 is effectively a one-piece unitive member for reduction of cost and ease of repair of the gate valve. In addition to the elastomeric first part 46 as described above, an additional or second part is also preferably utilized. This second part is the rigid, preferably metallic, stiffening ring 68. The siffening ring is a member fabricated into the elastomeric first part 46 to add rigidity and life to the sealing sleeve 44. It includes an annular flat segment 72 adhered to the radially interior face of the first part 46 and a J-shaped segment 74 extending axially interiorly therefrom. The longer leg 76 of the J-shaped segment is adhered to the radially exterior edge of the sealing projection 50 while the remaining curved segment 78 is molded into the sealing projection 50. In this manner, the gate plate may be slid against the opposed interior faces 64 of the sealing projections which are sufficiently resilient to effect a water tight seal whether the gate plate is in the open or closed position. Strength is provided to the elastomeric first part 46 of the sealing sleeve by virtue of the rigid, metallic stiffening ring 68. The composite sealing sleeve 44 is effectively a one piece member for convenience during repair or reconstruction, eliminating all metal to metal sliding contacts.

Short cap screws 82 extend through threaded holes 84 in the sleeve at symmetrically spaced locations for being threadedly received in the threaded holes 84 in the housing plates through holes 86 in the sleeve. These short cap screws with their associated threaded holes will position the sealing sleeves in proper position on the housing plates prior to the coupling of the pipes thereto. The holes 56 in the sleeve, having been positioned by the short cap screws 82, will be oriented to align with the holes 30 of the housing plates as well as the holes of the flanges of the pipes so that when cap screws 20 are positioned through the holes of the flanges of the pipes to be coupled and the holes 56 of the sleeves, they may be threadedly received in the threaded holes 30 of the housing plates.

The gate plate 14 is a rectangular elongated piece of sheet metal having an aperture 88 at its first or lower apertured portion 90 and having an imperforate second or upper portion 92. The gate plate 14 is located within the chamber 58 in sliding contact with the free faces 64 of the sealing projections 50. It is reciprocable from an upper or retracted position wherein the aperture 88 of the gate plate is in alignment with the apertures 28 of the housing plates and the central apertures 94 of the sleeves. The size of the apertures of these various members is essentially the same as the internal diameter of the pipes to be coupled through the gate valve. The gate plate 14 is also reciprocable to a lower or advanced position wherein the imperforate upper part 92 of the gate plate is positioned to block the flow of fluid through the pipes and the gate valve 10. The retracted position is illustrated by the solid line showing of FIG. 1. The advanced position is shown in phantom lines in FIG. 1. There is no need to provide a knife edge to any edge of the gate plate due to the spacing of the sealing sleeves within the housing. All edges of the gate plate are at right angles with respect to their faces for reduced fabrication cost with no decrease in efficiency during repair, reconstruction, operation and use.

The actuator 16 is located above the housing 12 and gate plate 14. This actuator has an intermediate horizontal plate 96 with four depending sections of channel iron 98. The sections of channel iron are fixedly positioned at their lower ends to the upper elongated corner bolts 36 of the housing. The upper portions of the channel iron are coupled to the underside of the horizontal support plate 96 in the conventional manner.

Mounted to the horizontal plate 96 and extending upwardly therefrom is a pneumatic actuator cylinder 102 supporting an axially reciprocable actuator rod 104. The rod has a piston, not shown, at its upper end reciprocable within the cylinder between the lower advanced position and the upper retracted position. An actuator line 106 is coupled with conventional control mechanisms to drive, pneumatically or hydraulically, the piston and, consequently, the actuator rod between the upper open position and the lower closed position all in the conventional manner. The lower end of the actuator rod 104 is releasably coupled to the upper end of the gate plate through a releasable pin 108 for movement of the gate plate concurrently with the movement of the actuator rod. In this manner, the movement of the gate plate is effected by an operator to move the gate plate between an upper position where fluid may flow through the pipes and gate valve and a closed position precluding the flow of fluid therethrough.

Inasmuch as the gate plate 14 is formed with blunt edges rather than the more traditional knife edges of previous gates of knife valves, the gate plate may be removed from the housing through releasable pin 108, and replaced therein from the lower edge of the housing. In known prior art devices, the use of contacting seal portions of the sleeves required that the support and actuator be removed from the housing in order to remove and replace the gate plate as for repair purposes. This was so that the gate plate could be returned by movement of its knife edge first entering the housing between the two sleeves under compression.

In a second or alternate embodiment, the short cap screws 82 along with their associated holes in the sleeve and associated threaded holes 84 in the housing plates have been eliminated. In this alternate embodiment, the coupling of the sleeves to the housing plates is effected by the same cap screws, all of a common size, which couple the pipes to the housing plates with the sleeves therebetween. The other operating components of the gate valve are the same as that described with respect to the first or primary embodiment.

The present disclosure includes that contained in the appended claims as well as that of the foregoing description. Although this invention has been described in its preferred forms with a certain degree of particularity, it is understood that the present disclosure of the preferred form has been made only by way of example and that numerous changes in the details of construction and combination and arrangement of parts may be resorted to without departing form the spirit of the invention.

Now that the invention has been described, what is claimed is:

1. A gate valve comprising:
   housing plates secured together in face to face relationship with an aperture extending through each housing plate in alignment about a central axis and defining a chamber therebetween;
   a gate plate, annular sleeves fabricated of an elastomeric material and having sealing projections positioned in operative association with the apertures and extending into the chamber a predetermined distance to define a space therebetween with the sealing projections extending axially and lining the apertures, the sleeves also having washer-like sections on the exterior faces of the housing plates, the sleeves also having rigid reinforcing rings formed into the elastomeric material, the rigid reinforcing rings having first portions extending radially with respect to the central axis adjacent to the interior faces of the housing plates, second portions extending generally axially with respect to the central axis along the entire length of the apertures defined by the housing plates, and third portions extending generally radially with respect to the central axis adjacent to the washer-like sections and along the exterior faces of the housing plates for deforming only a small portion of the sealing projections into sealing engagement with said gate plate; and
   said gate plate being within the chamber formed with an imperforate section and an apertured section in sliding contact with the sealing projections and reciprocable between an open position wherein the apertured section is located between the apertures and a closed position wherein the imperforate section is located between the apertures.

2. A gate valve assembly comprising;
   a gate plate,
   a housing including two parallel housing plates with each housing plate having an aperture extending therethrough, spacer means securing said housing plates together in face to face relation with their apertures in alignment about a central axis and defining a chamber therebetween, the housing also including two elastomeric annular sleeves with each having an axially interior sealing projection lining an aperture and extending into the chamber a predetermined distance to define an annular space between the sealing projections and with each sleeve also having an axially exterior washer-shaped gasket positioned on an axially exterior face of a housing plate and extending radially outwardly from its associated aperture, the sleeves also having reinforcing rings formed into the elastomeric material, the rigid reinforcing rings having first portions extending radially with respect to the central axis adjacent to the interior faces of the housing plates, second portions extending generally axially with respect to the central axis along the entire length of the apertures defined by the housing plates, and third portions extending generally radially with respect to the central axis adjacent to the washer-shaped gaskets and along the exterior faces of the housing plates for deforming only a small portion of the sealing projections into sealing engagement with said gate plate and means for coupling each washer-shaped gasket to an exterior face of a housing plate thus allowing for the replacement of a sleeve without the disassembly the housing plates or associated mechanisms;

said gate plate being formed with a first imperforate section and a second section having an aperture and reciprocable within the chamber in sliding contact with the axial interior ends of the sealing projections between an open position wherein the aperture of the gate plate is located in axially alignment with the apertures of the housing plates to allow fluid flow through the passage and a closed position wherein the imperforate portion of the gate plate is located between the apertures of the housing plates to preclude fluid flow through the passage, said gate plate having edges all of which are not formed as knives; and an operator controlled actuator including an actuator cylinder and a selectively reciprocable rod to selectively reciprocate the gate plate between the open and closed positions, the actuator also including support means to position the actuator cylinder and rod in operative proximate to the gate plate and housing and further including means for coupling the gate plate and rod during operation and use and for uncoupling the gate plate and rod to allow removal of the gate plate from the end of the housing plates remote from the actuator without disassembly of the housing plates or associated mechanisms with the sealing projections being spaced from each other even when the gate plate is removed from the housing.

3. The gate valve assembly as set forth in claim 2 wherein the facing ends of the sealing projections are flat with rounded edges extending therefrom and with the distance between the facing ends being between about 20 and 40 percent of the thickness of the gate plate.

* * * * *